(No Model.)

P. KENNEDY & C. J. DISS.
SECONDARY BATTERY.

No. 415,327. Patented Nov. 19, 1889.

WITNESSES
John Becker.
Charles A. Herbert.

INVENTORS
Patrick Kennedy
Charles J. Diss
per James A. Whitney
Atty.

UNITED STATES PATENT OFFICE.

PATRICK KENNEDY AND CHARLES J. DISS, OF BROOKLYN, NEW YORK.

SECONDARY BATTERY.

SPECIFICATION forming part of Letters Patent No. 415,327, dated November 19, 1889.

Application filed October 24, 1887. Serial No. 253,164. (No model.)

*To all whom it may concern:*

Be it known that we, PATRICK KENNEDY and CHARLES J. DISS, both of Brooklyn, in the county of Kings and State of New York, have invented certain new and useful Improvements in Storage-Batteries; and we do hereby declare that the following is a full, clear, and exact description of the invention, which will enable others skilled in the art to which it appertains to make and use the same.

This invention relates to the soft-metal plates which are commonly employed in storage-batteries for containing the "active material," so called. With such plates as heretofore constructed the said material has been liable to be displaced or to fall out from the receptacles comprised in the plates by warping, twisting, or other change in the form of the plates during the vicissitudes of use. The object of our invention is to obviate this evil and to provide for the secure retention of the active material in place regardless of the warping, twisting, or other change of the form hereinbefore referred to. It comprises a novel means, hereinafter fully particularized, whereby said object is accomplished.

Figure 1:
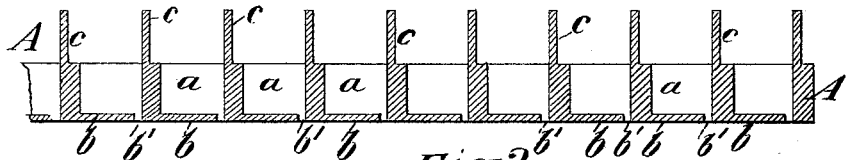
Figure 2:
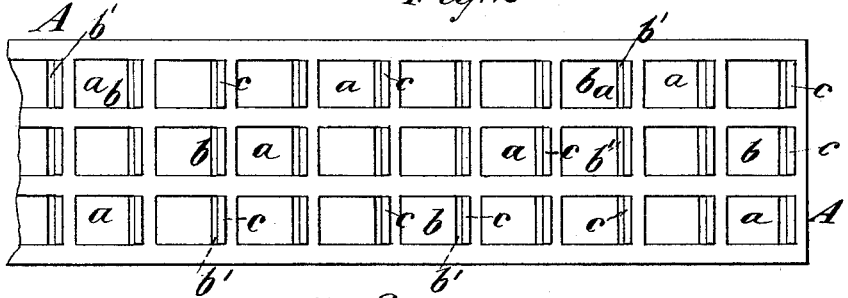
Figure 3:
Figure 4:
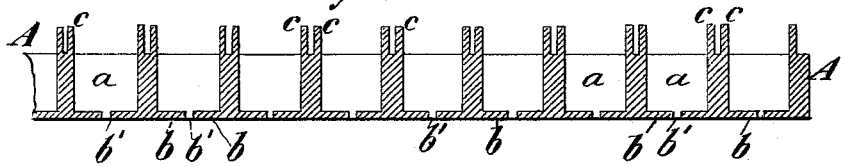
Figure 5:
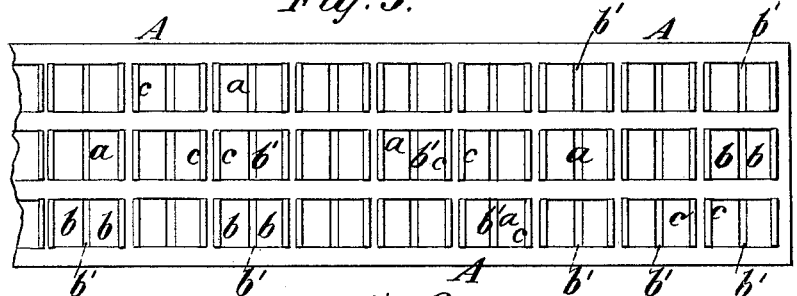
Figure 6:
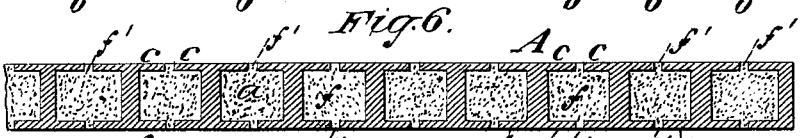

Figure 1 is a longitudinal sectional view, and Fig. 2 is a plan view showing a lead plate constructed according to our said invention in a condition preparatory to receiving the active material. Fig. 3 is a longitudinal sectional view corresponding to Fig. 1, but showing the plate in the completed condition, with the material arranged in place and with the plate arranged to retain the same in position. Fig. 4 is a longitudinal sectional view, and Fig. 5 a plan view showing a modification of a lead plate made according to our said invention in a condition preparatory to receiving the active material. Fig. 6 is a longitudinal sectional view corresponding to Fig. 4, but showing the plate in the completed condition, with the material arranged in place and with the plate arranged to retain the same in position.

The plate A may be of the usual size, thickness, and proportions, and is provided with the cells $a$. Each of these cells has a bottom $b$, the outer surface of which should be substantially flush with the plane of the lower surface of the plate. Through each bottom $b$ of each cell $a$ is an opening $b'$. At the opposite side of the plate—in other words, at the upper open ends of the plate, as shown in Figs. 1 and 2—are provided lips $c$, which should be integral with the plate $a$.

The active material $f$, of any suitable or ordinary kind or character, is placed in the cells $a$, as indicated in Fig. 3, and the lips $c$ are then brought down over the previously-open ends of said cells, as represented in said Fig. 3. The lips $c$ are so proportioned as to leave to each cell an opening $f'$, which, in conjunction with the opening $b'$ at the opposite ends of the cells, permits the requisite circulation through the active material. If desired, the opening $f'$ may be formed by means of perforations in the lip $c$. The active material is firmly held within the cell without in any manner affecting its usual operation so far as concerns the storage of electricity or the giving out thereof on occasion, and the said material is securely retained in place regardless of any warping, twisting, or other change of shape which may occur in the plate A during any of the ordinary vicissitudes of use.

When desired, the openings $b'$, instead of being at one side of the lower end of the cells $a$, as shown in Fig. 1, may be at any other part of the bottom $b$—as, for example, at the center thereof, as shown in Fig. 6; and in like manner the cells $a$, instead of having each a single lip at one side of its open end thereof, may be provided with two or more at the circumference of its said open end—as, for example, as shown in Fig. 4, in which each cell is provided at said end with two lips $c$, placed opposite each other, and which, when bent inward over the active material $f$, leave between them a space which constitutes an opening corresponding to the opening $f'$. (Shown in Figs. 2 and 3.)

The lead plates constructed as hereinbefore described may be formed of wrought or rolled lead by any suitable mechanical operation or apparatus; or said plates may be cast in suitable molds.

What we claim as our invention is—

A storage-battery plate constructed with cells $a$, having fixed bottoms, the cell-forming partitions terminating in vertical lips adapted to be turned down over the top of said cells, the bottoms and the turned-down lips forming the circulating-openings $b'$ and $f'$, substantially as described.

PATRICK KENNEDY.
CHARLES J. DISS.

Witnesses:
CHARLES A. HERBERT,
ISIDORE A. LEVY.